United States Patent

Thumma

[11] 3,856,264
[45] Dec. 24, 1974

[54] PORTABLE WHEEL STAND

[76] Inventor: Francis L. Thumma, 3714 W. Rose Ln., Phoenix, Ariz. 85019

[22] Filed: Aug. 4, 1972

[21] Appl. No.: 278,103

[52] U.S. Cl. ............................................... 254/88
[51] Int. Cl. ............................................ E02c 3/00
[58] Field of Search ... 254/88; 248/436, 439, 188.6; 108/131–133

[56] References Cited
UNITED STATES PATENTS

| 1,650,182 | 11/1927 | Brochu | 254/88 |
| 1,871,129 | 8/1932 | Pierce | 254/88 |
| 3,386,703 | 6/1968 | Thumma | 254/88 |

FOREIGN PATENTS OR APPLICATIONS

| 994,228 | 8/1951 | France | 254/88 |

*Primary Examiner*—Othell M. Simpson

[57] ABSTRACT

A portable wheel stand, wherein a platform member is supported above the ground upon downwardly extended legs pivoted thereto; a ramp member pivotally mounted to the platform member on a common axis with the pivotal mounting on one of the leg members to said platform member; the ramp member extending on an incline from the ground to the upper portion of the platform member; the leg members and ramp member being pivotally connected with the platform member so as to be foldable into compact relationship; the platform member and ramp member being channel shaped in cross section and having opposite flanges nesting within each other, the leg members nesting between the flanges of the platform member, and latch members adapted to lock the leg members in a downwardly directed position relative to the platform member so as to prevent pivotal movement of the leg members relative to the platform member when a vehicle wheel is rolled upon the ramp member and onto the platform member.

8 Claims, 7 Drawing Figures

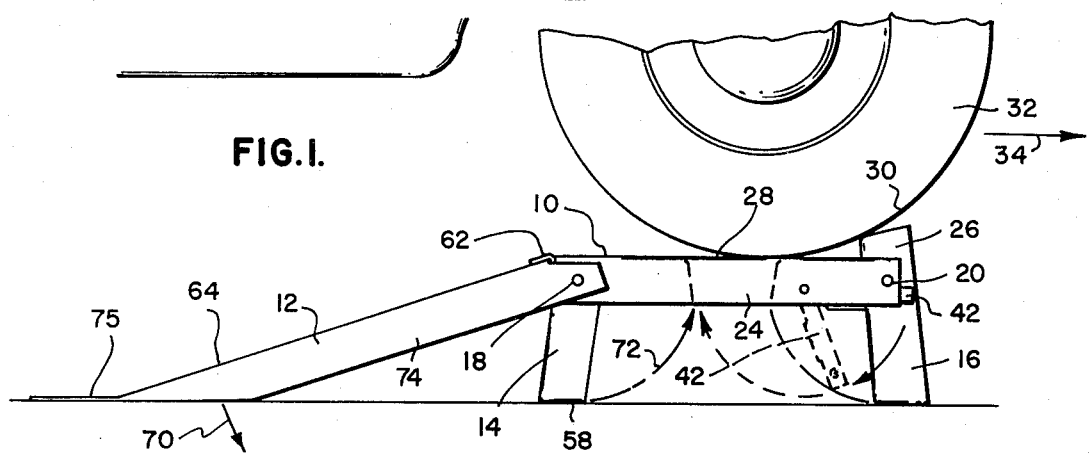
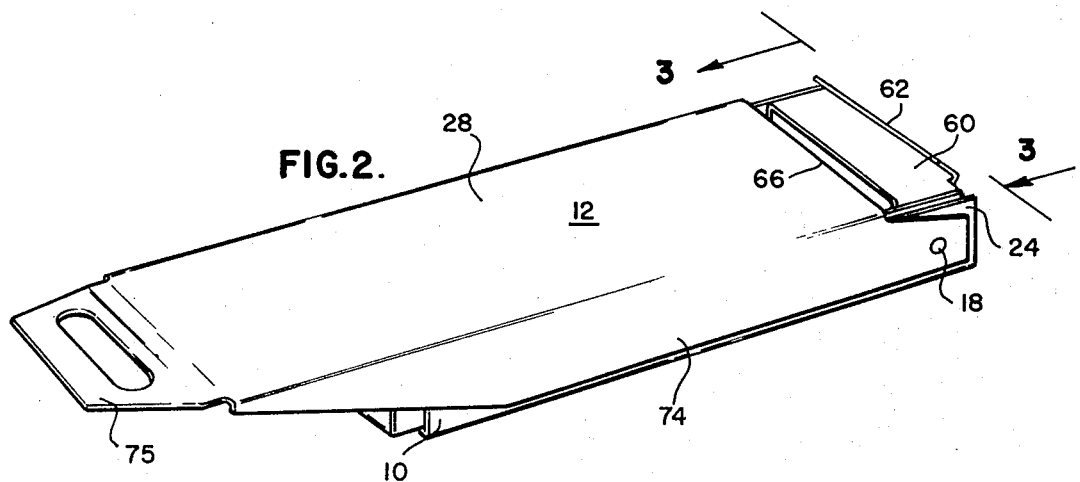
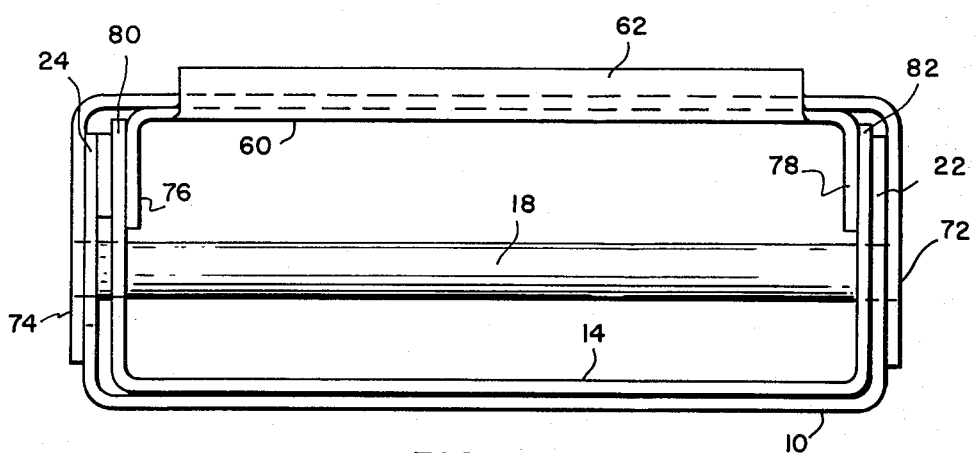

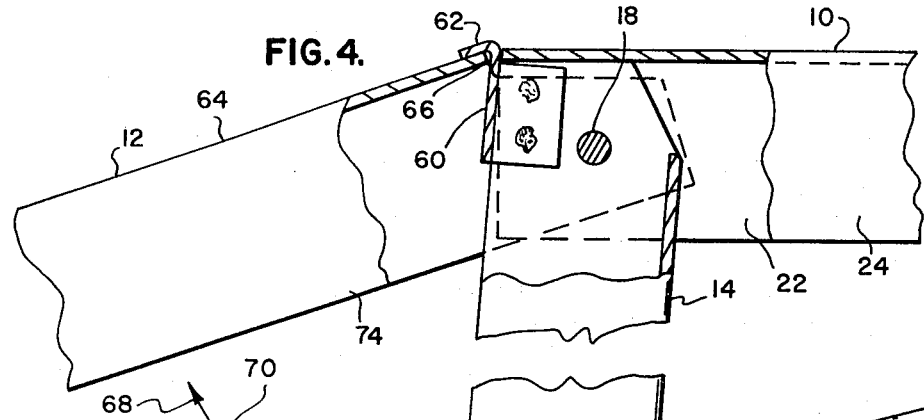
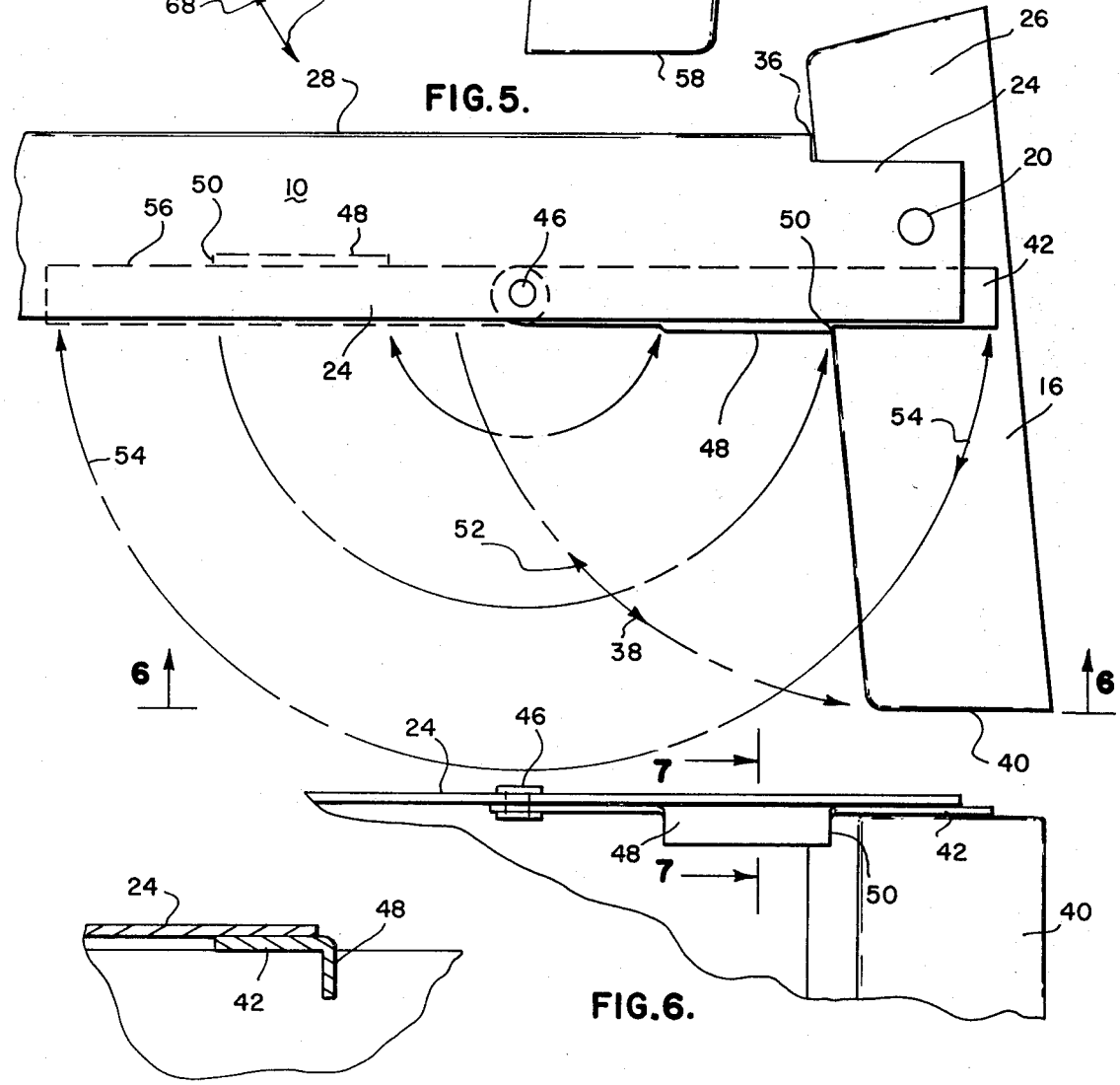

PORTABLE WHEEL STAND

BACKGROUND OF THE INVENTION

In the prior art there have been many devices for elevating vehicles including various jacks and there have been many supporting stands to hold vehicles in elevated position so that mechanics or other persons servicing equipment at the lower side of the vehicle may have sufficient room to crawl under the vehicle and perform whatever maintenance or repair operations are needed.

In many areas where there are no elevating jacks available there has been a need for a portable wheel stand which may be driven onto, to elevate the wheels of a vehicle and it has been desirable to provide a simple facility for elevating one end of a vehicle and supporting it in elevated position for various service and maintenance operations thereon.

Various prior art vehicle wheel elevating stands have been very bulky and have been unreliable due to a tendency to collapse and also such bulky and unreliable ramp type platforms have been expensive and relatively bulky to maintain in storage.

In many areas, such as service stations or the like, emergency vehicle elevating means is oftentimes desirable when floor jacks and regular hydraulic jacks are all in use. Furthermore, there are many instances wherein individuals who own vehicles need a simple means which may be quickly and easily utilized without ordinary jack stands and hydraulic or other elevating jacks to elevate the vehicle and support it in position for various maintenance operations thereunder.

SUMMARY OF THE INVENTION

The present invention relates to improvements relative to the portable wheel stand disclosed in my U.S. Pat. No. 3,386,703, issued June 4, 1968.

The improvements of the present invention relate to the pivotal mounting of the ramp member and one adjacent leg member to the platform member all on a common axis, and to novel latch and brace means activated by pivotal movement of the ramp member and the leg member so as to hold the respective leg member in fixed position relative to the platform member and to prevent it from pivoting to a collapsing position when a vehicle is driven onto the ramp member and platform member. Additionally, the invention relates to further latch means pivoted to the platform member and movable into interference and locking position relative to another leg member on a forward end of the platform member so that both leg members are pivotally connected to the platform member and fixable relative thereto in order to prevent pivotal movement of either of the leg members into collapsed position when a vehicle is driven onto the ramp member and platform member of the invention.

Additionally, the present invention provides an improved ramp member having a horizontal extension which extends horizontally on the ground beyond the inclined portion of the ramp member so that a wheel driven onto the horizontal extension of the ramp member frictionally holds the ramp member while the wheel is driven up onto the incline portion of the ramp member to thereby prevent the ramp member from causing the wheel stand of the invention to slide forward and to slide away from the wheel which is starting to roll upward onto the inclined ramp member.

The present invention alleviates the tendency of the wheel stand to slide away from the wheels which are rolling upward on the inclined ramp member and also to prevent the tendency of the platform supporting legs of the invention from pivoting into collapsed position relative to the platform when a wheel is driven onto the ramp and platform member. The present invention, therefore comprises substantial improvements over my former patent and renders the present wheel stand very efficient and reliable in operation when placed on various surfaces such as concrete, asphalt or any other surface on which it is desirable to elevate the wheels of a vehicle which may be rolled onto the ramp member and platform member of the invention.

Accordingly, it is an object of the invention to provide an improved portable wheel stand which includes latch means for locking the leg members of the stand relative to the platform member and to prevent the legs from pivoting from downwardly extended position into collapsed position.

Another object of the invention is to provide a portable wheel stand wherein a horizontal extension of the ramp member prevents the wheel stand of the invention from sliding in the direction of movement of a wheel as it rolls upward on the ramp member of the wheel stand of the invention.

Another object of the invention is to provide a novel improved portable wheel stand wherein a platform member, a ramp member, and a leg member are all pivoted together on a common axis and wherein the platform member is channel shaped and having opposed flanges, the ramp member is channel shaped and provided with opposed flanges disposed at the outer side of the platform member, and the respective leg is pivoted between the flanges of the platform member, and wherein latch means coupled to the leg is engaged with the end of the ramp member at its median portion and moves about the axis on which the leg member is pivoted to the platform member and the ramp member so that pivotal movement of the ramp member about said last mentioned axis causes the latch member to force the respective leg member into downwardly disposed position and to hold it in said position and lock in such position when the invention is in position for receiving a vehicle wheel thereon.

Further objects and advantages of the invention may be apparent from the following specification, appended claims and accompanying drawings.

BRIEF DESCRIPTION OF THE DRAWINGS

FIG. 1 is a side elevational view of a portable wheel stand in accordance with the present invention, and illustrating fragmentarily a portion of an automobile vehicle having one of its wheels supported on the platform of the wheel stand of the invention and illustrating by arrows the relative direction of pivotal movement of the legs and the ramp of the wheel stand relative to the platform member thereof when converting the wheel stand from the attitude shown in FIG. 1 to a folded collapsed disposition as shown in FIG. 2;

FIG. 2 is a perspective view of the wheel stand of the invention shown in collapsed position ready for storage;

FIG. 3 is an enlarged end view of the wheel stand of the invention taken from the line 3—3 of FIG. 2;

FIG. 4 is an enlarged fragmentary side elevational view of the wheel stand of the invention showing the juncture of the ramp member and platform member and respective leg member, and showing portions thereof broken away and in section, to amplify the illustration;

FIG. 5 is a fragmentary side elevational view of a forward end of the platform member of the invention opposite to that shown in FIG. 4 and showing the other leg member of the invention in downward directed position held locked by a latch member pivoted to the platform member and illustrating by curved arrows the pivotal relationship of the leg member and the latch member relative to the platform member;

FIG. 6 is an enlarged fragmentary bottom plan view taken from the line 6—6 of FIG. 5; and FIG. 7 is an enlarged fragmentary sectional view taken from the line 7—7 of FIG. 6.

DESCRIPTION OF THE PREFERRED EMBODIMENTS

As shown in FIG. 1 of the drawings, the wheel stand of the invention is provided with a platform member 10, a ramp member 12 and leg members 14 and 16. The platform member 10, the ramp member 12 and the leg 14 are all pivoted together on a common axis pivot member 18, as will be hereinafter described. The leg member 16 is pivoted to the platform member 10 on a pivot member 20 and the platform member 10 is generally channel shaped in cross section, as shown in FIG. 3 of the drawings, wherein the platform member 10 is upside down. It will be seen that this platform member 10, being channel shaped in cross section, is provided with a pair of opposed flanges 22 and 24, between which an upper wheel stop portion 26 of the leg 16 is pivotally mounted and projectible to an elevation above the upper surface 28 of the platform member 10 so as to be engaged by the periphery 30 of a wheel 32, to stop the wheel when moving in a forward direction as indicated by the arrow 34 in FIG. 1 of the drawings.

As shown in FIG. 5, the portion 26 engages a stop portion 36 at an end of the upper surface 28 of the platform member 10, this portion 36 forming a stop portion, and disposed between the flanges 22 and 24, and stops downward pivotal movement of the leg member 16 in the direction of an arrow 38, all as shown in FIG. 5 of the drawings.

A lower end 40 of the leg 16 is adapted to engage the surface of the ground or any other suitable surface on which the wheel stand of the invention may be located.

The leg member 16 is locked in the downward direction by means of a latch member 42 which is pivoted on a pin 46 in connection with the flange 24 of the platform member 10, and this latch member 42 is provided with a flange shaped handle 48, shown in FIGS. 5, 6 and 7. An end of the handle 48, designated 50, is shown in FIGS. 5 and 6 and this end 50 is abutted to the side of the leg member 16 in opposition to the stop 36 so as to prevent pivotal movement of the leg member 16 in a direction of an arrow 52 in FIG. 5 of the drawings, and thus the latch 42, when in the position shown in FIGS. 5, 6 and 7, prevents collapsing pivotal movement of the leg member 16 in a direction of the arrow 52 in FIG. 5.

The latch member 42 is, however, pivotal into a released position by moving it in the direction of arrows 54, as shown in FIG. 5 of the drawings, so that the latch member may be disposed in broken line position 56, as shown in FIG. 5, releasing the handle portion 48 and its latching edge 50 from the side of the leg member 16 so that it may be pivoted in the direction of an arrow 52 and between the flanges 22 and 24 of the platform member 10.

The leg member 14 is provided with a lower end 58 adapted to engage the ground or any other suitable surface, and connected to this leg member 14, and pivotal about the axis of the shaft 18, is a latch member 60 having a hook portion 62 adapted to engage an upper surface 64 of the ramp member 12 at an end 66 thereof adjacent an end of the platform member 10, thus the ramp member when pivoted to the position shown in FIG. 4 and pivoted in the direction of an arrow 68, pivots the leg member 14 into the solid line position shown in FIG. 4 and when the ramp member 12 is moved in the direction of the arrow 70 shown in FIG. 4, and in the direction of the arrow 70 shown in FIG. 1, the latch portion 62 is released for lost motion pivotal movement about the axis of the shaft 18 and to thereby permit the leg member 14 to pivot into position between the flanges 22 and 24 of the platform member and to permit the respective flanges 72 and 74 of the ramp member 12 to be pivoted into position on the outer sides of the flanges 22 and 24, all as shown best in FIG. 3 of the drawings. In this position, the leg member 14 is in collapsed position and the entire assembly is collapsed as shown in FIG. 2 of the drawings. Conversely, when the ramp member 12 is pivoted in the direction of the arrow 68, the latch 62, pivoting around the axis of the shaft 18, forces the leg member 14 into downward position and holds it and locks it to prevent it from moving in the direction toward collapsed position as indicated by an arrow 72 in FIG. 1 of the drawings.

The ramp member 12 is provided with a horizontal portion 74 adapted to rest on the surface of the ground, and this portion 74 is adapted frictionally to be engaged beneath the tire of an automobile wheel or the like as the tire rolls upward on the inclined surface 64 of the ramp 12, and to thereby prevent the ramp and the remaining portions of the wheel stand to be moved away from the wheel as it rolls up onto the inclined surface of the ramp 12. Additionally, the latch 60 and the latch 42 prevent the legs of the wheel stand from pivoting to collapsed position and thereby insure that the wheel stand will operate reliably during the movement of the vehicle wheel onto the ramp 12 and platform 10.

It will be seen that the latch member 60 is provided with flanges 76 and 78, welded or otherwise secured to respective flanges 80 and 82 of the channel shaped in cross section leg 14.

It will be understood that these legs 14 and 16 are preferably channel shaped in cross section as are the platform and ramp members 12 to provide for structural rigidity as well as relative lightweight construction.

It will be obvious to those skilled in the art that various modifications may be resorted to without departing from the spirit of the invention.

I claim:

1. In a portable wheel stand, the combination of: an elongated platform member having opposite ends and disposed to be supported in a substantially horizontal position above the surface of the ground; first and second leg members having normally upper portions pivotally connected to said platform member; said leg members movable from a position substantially parallel to said platform member and into a downwardly directed position; said leg members having normally lower ends disposed to engage the ground and to support said platform member in said horizontal position; and an elongated normally inclined ramp member having a normally inclined upper wheel engaging surface; said ramp member having a first end pivotally connected to one of said opposite ends of said platform members; said ramp member having a second end disposed to rest on the ground so as to maintain said ramp member in an inclined position and extending from the ground to substantially the level of said platform member; said ramp member pivotally movable relative to said platform member so as to permit said ramp member and said leg members to be disposed in substantially contiguous parallel relation to said platform member for collapsing said portable wheel stand into compact position; first and second latch members pivotally connected to said platform member; said first and second latch members disposed and adapted respectively to brace and hold said first and second leg members in downwardly directed relation to said platform member and to prevent pivotal movement of said leg members into a nonsupporting position, relative to an elevated position of said platform member.

2. The invention as defined in claim 1, wherein: one of said leg members is pivoted to said platform member at an opposite end thereof from said ramp member; said last mentioned leg member having a wheel stopping upper end portion projecting above said platform member when said leg member is pivoted downwardly to a position wherein the lower end thereof is engaged with the ground; said platform member being channel shaped and having a pair of spaced flanged portions, said platform member being open between its flange portions at said last mentioned end to permit said wheel-stopping upper end portion of said leg member to project upwardly between said flange portions and above said platform member.

3. The invention as defined in claim 1, wherein: said ramp member, said platform member and one of said leg members are all pivoted together on a common axis.

4. In a portable wheel stand, the combination of: an elongated platform member having opposite ends and disposed to be supported in a substantially horizontal position above the surface of the ground; first and second leg members having normally upper portions pivotally connected to said platform member; said leg members movable from a position substantially parallel to said platform member and into a downwardly directed position; said leg members having normally lower ends disposed to engage the ground and to support said platform member in said horizontal position; and an elongated normally inclined ramp member having a normally inclined upper wheel engaging surface; said ramp member having a first end pivotally connected to one of said opposite ends of said platform member; said ramp member having a second end disposed to rest on the ground so as to maintain said ramp member in an inclined position and extending from the ground to substantially the level of said platform member; said ramp member pivotally movable relative to said platform member so as to permit said ramp member and said leg members to be disposed in substantially contiguous parallel relation to said platform member for collapsing said portable wheel stand into compact position; first and second latch members pivotally connected to said platform member; said first and second latch members disposed and adapted respectively to brace and hold said first and second leg members in downwardly directed relation to said platform member and to prevent pivotal movement of said leg members into a nonsupporting position, relative to an elevated position of said platform member; one of said latch members is coupled to said last mentioned one of said leg members and is provided with an engaging portion engageable with said ramp member about said common axis whereby said last mentioned leg member is moved into and held in a downwardly directed supporting position relative to said platform member when said ramp member is pivoted to an inclined position relative to said platform member.

5. The invention as defined in claim 4, wherein: said engaging portion of said last mentioned latch member engages an upper surface of said ramp member at an end thereof adjacent said platform member to allow lost motion between said ramp member and said latch member and respective leg member when pivotally folding said ramp member and respective leg member into contiguous relation to said platform member.

6. The invention as defined in claim 1, wherein: said ramp member and said platform member are channel shaped in cross section; said ramp member and said platform member having flanges; the flanges of said ramp member disposed adjacent outer sides of said flanges of said platform member; and said leg members are disposed between said flanges of said platform member.

7. The invention as defined in claim 6, wherein: one of said latch members is pivoted to one of said flanges of said platform member and pivotally movable into and out of engagement with one of said leg members, said last mentioned one of said latch members having a flange shaped handle having an end abutted to said last mentioned one of said leg members when moved into engagement therewith for bracing the same.

8. The invention as defined in claim 1, wherein: said ramp member at said second end thereof is provided with a horizontally directed wheel holdable portion adapted to be frictionally held under a vehicle wheel as said wheel rolls upwardly on said ramp member when disposed in inclined position; whereby said ramp member is loaded down while said horizontal portion is frictionally held under said wheel to thereby prevent said wheel stand from sliding away from said wheel as it starts upward on an incline on said ramp member.

* * * * *